(12) United States Patent
Hancock et al.

(10) Patent No.: US 6,231,418 B1
(45) Date of Patent: May 15, 2001

(54) VERSATILE WILDLIFE GAME CALL

(76) Inventors: Bruce J. Hancock, Rte. 2 Box 245E, Walla Walla, WA (US) 99362; Jack Bowers, 126 Forest Rd. 20, Randle, WA (US) 98377

( * ) Notice: Subject to any disclaimer, the term of this patent is extended or adjusted under 35 U.S.C. 154(b) by 0 days.

(21) Appl. No.: 09/390,288

(22) Filed: Sep. 3, 1999

(51) Int. Cl.$^7$ .................................................. A63H 5/00
(52) U.S. Cl. ........................................... 446/207; 446/397
(58) Field of Search .................................... 446/202–206, 446/207, 208, 213, 397

(56) References Cited

U.S. PATENT DOCUMENTS

| | | |
|---|---|---|
| D. 312,056 | 11/1990 | Ady . |
| 623,728 | 4/1899 | Marsters . |
| 733,122 * | 7/1903 | Bartholomew ........................ 446/207 |
| 2,182,692 | 12/1939 | Harbin . |
| 2,274,897 | 3/1942 | Horne . |
| 2,584,549 | 2/1952 | Carhart . |
| 3,029,554 | 4/1962 | Mobley . |
| 3,583,094 * | 6/1971 | Tribell ................................. 446/207 |
| 4,030,241 | 6/1977 | Gallagher . |
| 4,221,075 | 9/1980 | Gallagher . |
| 4,326,356 * | 4/1982 | Mason ................................... 446/73 |
| 4,416,038 * | 11/1983 | Morrone, III ........................ 24/487 |
| 4,637,154 | 1/1987 | Laubach . |
| 4,761,149 | 8/1988 | Laubach . |
| 4,850,925 * | 7/1989 | Ady ..................................... 446/207 |
| 4,874,341 * | 10/1989 | Ziegler ................................... 446/9 |
| 4,932,920 * | 6/1990 | Hearn .................................. 446/397 |
| 5,222,903 | 6/1993 | Parrott et al. . |
| 6,048,247 * | 4/2000 | Kownacki et al. .................... 446/66 |

* cited by examiner

Primary Examiner—D. Neal Muir
(74) Attorney, Agent, or Firm—Richard C. Litman

(57) ABSTRACT

A trapezoidal-shaped game call device with a tapered polypropylene body design and aperture to expel condensate and saliva. The top and bottom members of the body of the device are hinged together by a living hinge on one side and forms a friction grunter that can be rubbed against a hard surface to produce a rutting call on the other side. Rubber bands with a high percentage of rubber by weight are used as elastic reeds to insure consistency, and a silicon O-ring is also used to attach together the unhinged side of the calling device to stabilize the frictional grunter. A lanyard can also be provided on the device for convenient transport.

6 Claims, 4 Drawing Sheets

VERSATILE WILDLIFE GAME CALL

BACKGROUND OF THE INVENTION

1. Field of the Invention

The present invention relates to a wildlife game call and, more particularly, to a single call device used to imitate the calls of a wide variety of game and species.

2. Description of the Related Art

Animal calling devices have been in use by hunters and sportsman since the beginning of time. It was thought that native Americans and even cavemen utilized some form of animal calling or mimicking device. These animal calling devices come in all sorts of shapes, sizes and configurations and are well-known in the related art.

Most of these devices are blown or whistled into to produce a sound or call that will attract an animal or type of species. Representative devices are described in patents issued to Marsters (U.S. Pat. No. 623,728), Harbin (U.S. Pat. No. 2,182,692), Carhart (U.S. Pat. No. 2,584,549), Mobley (U.S. Pat. No. 3,029,554), Gallagher (U.S. Pat. Nos. 4,030,241 and 4,221,075), Laubach (U.S. Pat. Nos. 4,637,154 and 4,761,149) and Parrott et al. (U.S. Pat. No. 5,222,903).

Some of these devices are specifically designed to attract a specific animal or species. For example, the patents issued to Carhart (U.S. Pat. No. 2,584,549), Ady (U.S. Pat. No. Des. 312,056) and Laubach (U.S. Pat. No. 4,761,149) describe apparatuses designed to attract deer and elk, while the patents issued to Harbin (U.S. Pat. No. 2,182,692) and Marsters (U.S. Pat. No. 623,728) describe apparatuses designed to attract hawks and other birds.

Many devices are made of materials that are easily affected by outside elements and temperature extremes. The two patents issued to Gallagher (U.S. Pat. Nos. 4,030,241 and 4,221,075) utilize elastic bands that can easily lose their elasticity over time, and are subject to breaking under cold or cool conditions. The orifices of these devices are subject to cracking or splitting when bit down upon in cold or cool conditions as well.

Inherent design problems are also reflected in devices described in the related art. For example, in the patent to Laubach (U.S. Pat. No. 4,761,149), the bowed shape at each end of the rectangular device has a physical separation of about one-half inch. The separation places the planar members farther apart, such that more biting pressure is required to flex the opening closed to achieve the desired tone. This causes mouth fatigue over a period of time, and more difficulty in achieving consistent sounds from the Laubach device, due to the "room for error" that is caused by the larger opening being manipulated. This can be so difficult as to cause an upper denture (if worn by the user) to pop loose from the palate in the roof of the mouth.

What is needed is a game calling device that can replicate the call of a variety of game, have a trapezoidal shape and independently operable band reeds in the same device, be constructed of materials that can perform consistently in extreme conditions, be well-designed to expel condensate and saliva from the device, and have an orifice that is easy to operate.

None of the above inventions and patents, taken either singularly or in combination, is seen to describe the instant invention as claimed. Thus a wildlife game call solving the aforementioned problems is desired.

SUMMARY OF THE INVENTION

The instant invention, which we prefer to name the "Calls-M-All" multitone game call, describes a trapezoidal-shaped game call device with a tapered polypropylene body design and aperture to expel condensate and saliva. The top and bottom members of the body of the device are hinged together by a living hinge on one side and the other side includes a friction grunter that can be rubbed against a hard surface to produce a second game call. Rubber bands with a high percentage of rubber by weight are used as elastic reeds to insure consistency and a silicon O-ring is also used to attach the unhinged sides of the top and bottom members together and further stabilize the frictional grunter. In a preferred method of manufacture, the two sides with the living hinge and friction grunter are molded as a one-piece, monolithic unit. A lanyard can also be attached to the device for convenient transport.

It is a principal object of the invention to provide a versatile calling device that can imitate a wide variety of game calls.

It is an object of the invention to provide a game calling device including two distinct reed-type calls, a separate, third friction grunter call, and enlarged drain openings for saliva so that the calling device can function no matter how often used.

It is a further object of the invention to develop a game calling device made of materials that will not be affected by extreme weather conditions.

Still another object of the invention is to provide a better designed game calling device.

Yet a further object of the invention is to provide a game calling device molded of a suitable plastics material, with two halves joined together by a living hinge, the opposite side of the calling device including a friction grunter.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
FIG. 1 is an environmental, perspective view of a wildlife game call device according to the present invention.

The present invention is an improved wildlife game call apparatus 10. As generally shown in FIG. 1, the apparatus 10 comprises a trapezoidal-shaped elongated body 80.

Figure 2:
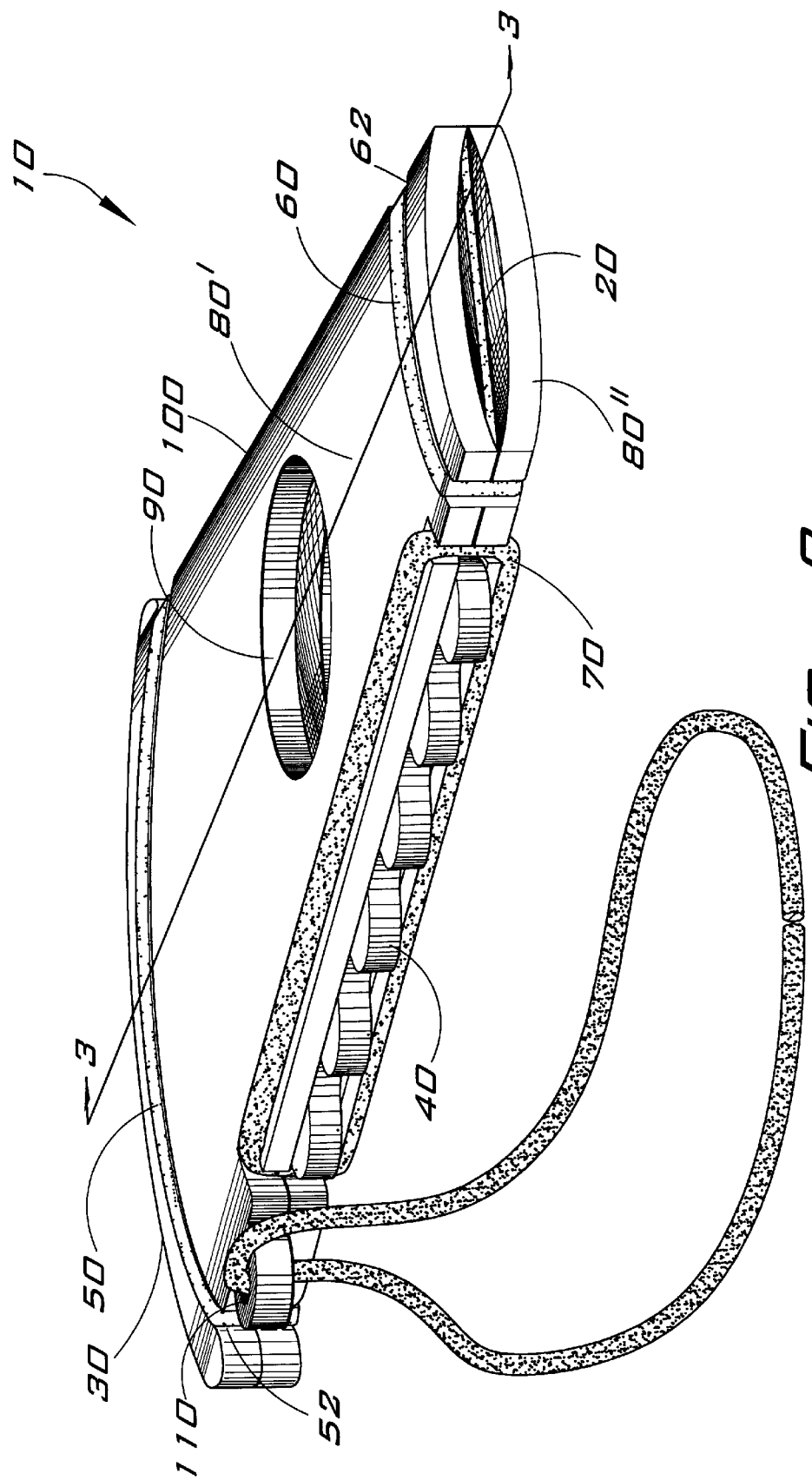
FIG. 2 is a perspective view of a game call device shown in FIG. 1, drawn to an enlarged scale.

As more specifically shown in FIG. 2, a first attachment means secures the top and bottom members 80',80" of body 80 together at the front end of the apparatus 10. The first attachment means is a #30 rubber band 60 that is encircled through and around the small end of the apparatus 10. The

30 rubber band 60 is 2" long and ⅛" wide, passes between top member 80' and bottom member 80" to act as a sounding reed and, preferably, is wrapped twice around the front end of the apparatus 10. The #30 rubber band 60 lies in a ⅛" wide track 62 encircling both members 80',80" adjacent the front end of for the apparatus 10.

The second attachment means secures the top and bottom members 80',80" together at the rear end of the apparatus 10. The second attachment means can be a second #30 rubber band 50 or a #62 rubber band 50 that is encircled around either the top member 80' or the bottom member 80" adjacent the large end of the apparatus 10. The #62 rubber band 50 is 2 ½" long and ¼" wide and is only wrapped once around the rear end of the apparatus 10. The #62 rubber band 50 lies in a ¼" wide encirculated track 52 and also acts as a sounding reed for the apparatus 10. The shorter and narrower #30 rubber band 60 also fits in the track 52 and is wrapped once around the apparatus 10.

Of course, the specific types and dimensions of rubber bands 50 and 60 just described are only preferred and exemplary. Other styles and types of bands certainly come within the invention as herein disclosed and claimed.

The call can be either inhaled or exhaled through to produce sound. Most calls work while inhaling (blowing into) only. The present invention works both ways.

The third means of attachment secures the top and bottom members 80',80" along one side of the apparatus 10. The top and bottom come together as a series of rounded and ridged projections along the unhinged side of one of the members 80',80" form a friction grunter 40, which is rubbed against a hard surface to imitate the sound of a rutting buck deer. The third attachment means is a silicon O-ring 70, which holds the members 80',80" together along the unhinged side while it is being used. A ring opening 110 may be provided and is also located on the end of the friction grunter 40 to accompany a lanyard or string.

Figure 3:
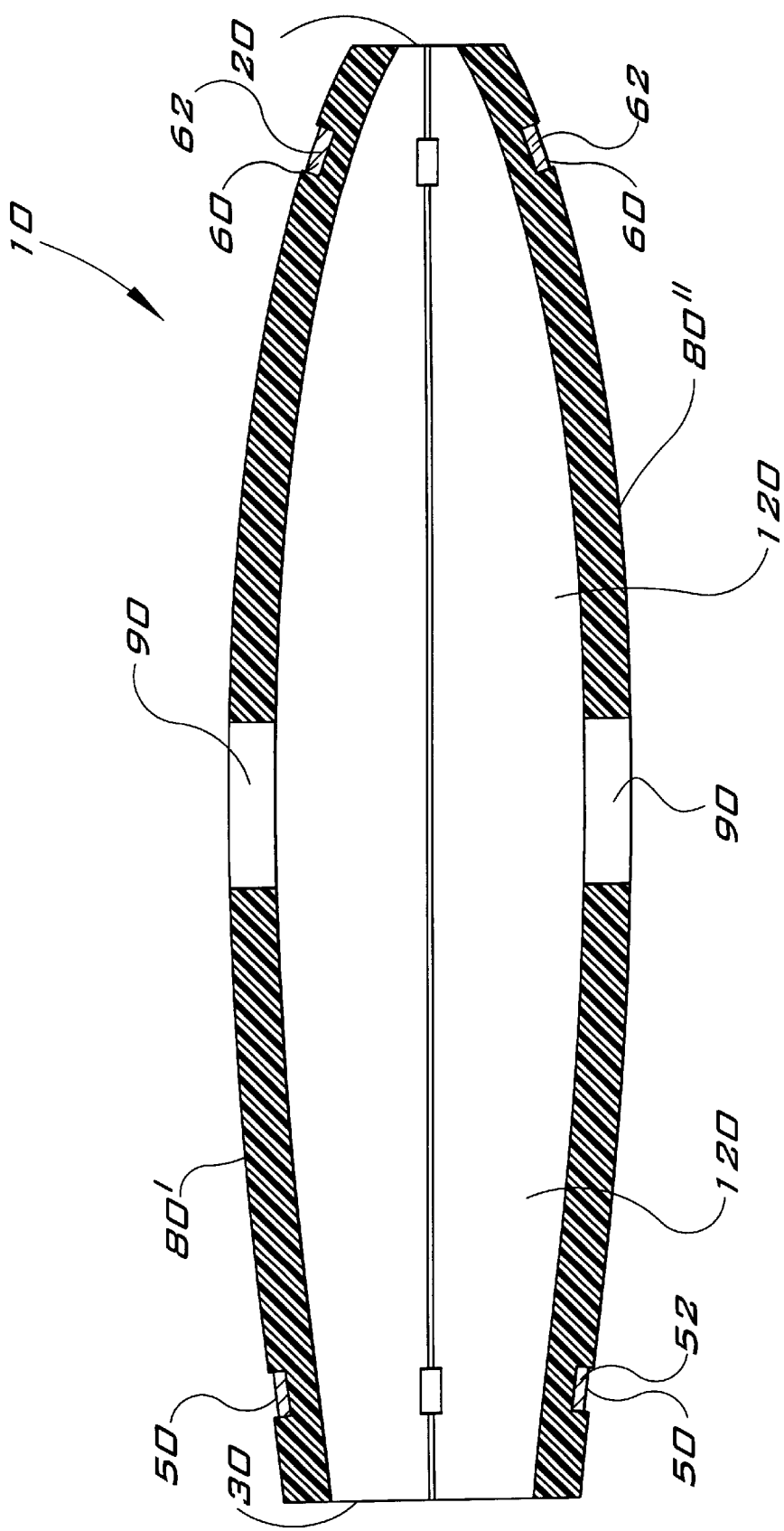
FIG. 3 is a largely diagrammatic, cross-sectional view, taken along lines 3—3 of FIG. 2.

The other side of the apparatus 10 is held together by a polypropylene hinge 100 that runs along the edge of the side. This living hinge 100 allows an air gap (not shown) to exist so the rubber band reeds will have room to vibrate and facilitate air to flow around both sides of the band and into the sound chamber 120 (See FIG. 3). It would also let condensation and saliva generated from exhaled air to pass around the band and exit the reed contact area of the apparatus 10. Without an air gap around the rubber band reed, condensation would be trapped against the reed and body of the apparatus 10, causing the reed to stick against the apparatus 10, resulting in no sound being produced.

Figure 4:
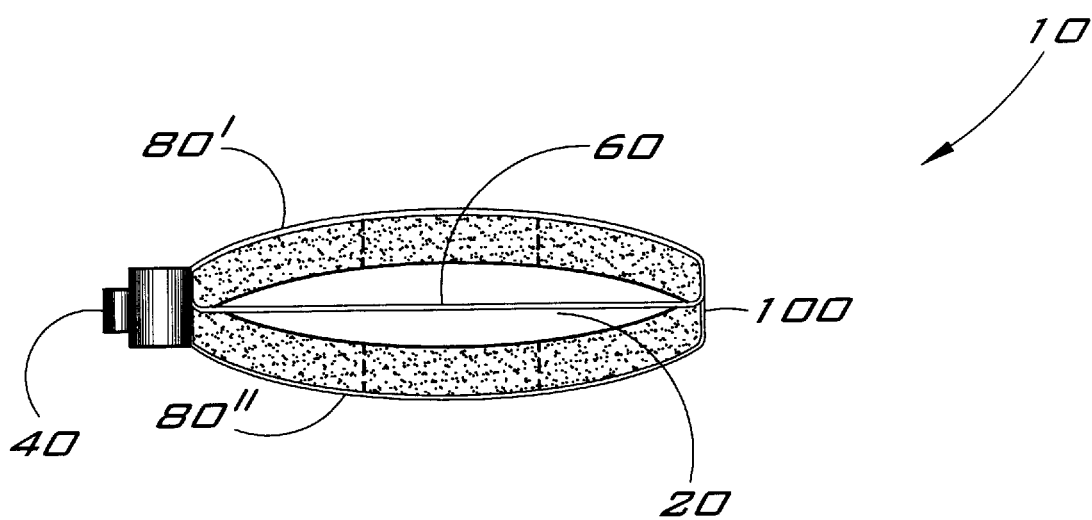
FIG. 4 is a front elevational view of the smaller opening only of a game call device according to the present invention.
Figure 5:
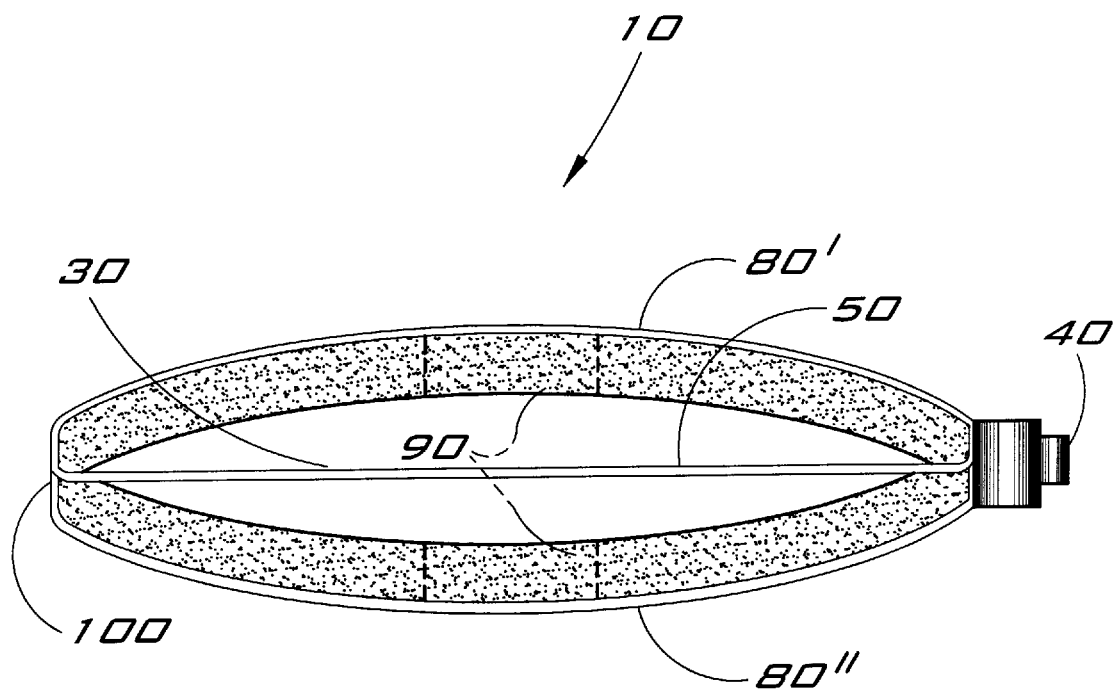
FIG. 5 is a rear elevational view of the larger opening only of a game call device according to the present invention.

Apertures 90 are located in the center of the apparatus 10 through the top and bottom members 80',80". The apertures 90 are 1" in diameter and provide an drain where condensation and saliva can be expelled from the apparatus 10. This can also be seen in FIG. 3, which also shows a sound chamber 120 formed between the top and bottom members 80',80". The sound chamber 120 extends from the front end ⅛" orifice 20, across the aperture 90, to the rear end ¼" orifice 30. A view of each orifice is provided in FIG. 4 and FIG. 5.

The trapezoidal shaped elongated body 80 is made entirely of polypropylene in the preferred embodiment of the invention. The #30 and #62 rubber bands 50,60 are 70–85% rubber by weight, which are higher than the standard 55% rubber by weight rubber band. The higher percent by weight rubber bands maintain their elasticity better in adverse temperatures and remain elastic longer than the 55% rubber by weight rubber bands. The silicon O-ring 70 used to secure members 80',80" together along the side having the friction grunter 40 is 1-⅛" in diameter and is used because it holds up better against breakage than rubber-based material. A user can either inhale or exhale into the apparatus 10 to produce a call.

The total length of the apparatus 10 is 3" and is 2-⅝" wide at the rear end and 1-5/16" wide at the front end. Operation of the apparatus 10 is simple and consists of blowing into either orifice 20,30 or rubbing the friction grunter 40 against a hard surface.

It is to be understood that the present invention is not limited to the embodiments described above, but encompasses any and all embodiments within the scope of the following claims.

We claim:

1. A wildlife game calling device comprising:
    a substantially trapezoidal-shaped body having a first end and a second end, a first side and a second side, said body including a first member having a first central aperture and a second member having a second central aperture, each said end having a width, wherein the width of the first end is less than the width of the second end, said first member being hingedly attached to the second member along said first side;
    one of said first and second members including a series of rounded projections extending along the second side to form a friction grunter;
    a first elastic band passing between and encircling said first member and said second member adjacent said first end;
    a second elastic band encircling one of said first and second members adjacent said second end;
    a third elastic band extending along said second side and joining said first and second members together to form a sounding chamber therebetween.

2. The device according to claim 1, wherein said body further includes a first track encircling said first and second members adjacent said first end for receiving said first elastic band, and a second track encircling said first and second members adjacent said second end for receiving said second elastic band.

3. The device according to claim 1, wherein said one of said first and second members includes an opening along the second side for receiving a lanyard.

4. The device according to claim 1, wherein said first elastic band and said second elastic band each contain 70–85% by weight rubber.

5. The device according to claim 1, wherein said third elastic band is a silicon O-ring.

6. The device according to claim 1, wherein said body is made of polypropylene.

* * * * *